Sept. 3, 1946.    A. G. RICHARDSON ET AL    2,406,853
ROTARY POSITION CORRECTOR
Filed Feb. 6, 1943    3 Sheets—Sheet 2

INVENTORS
AVERY G. RICHARDSON
FRANK O. CHESUS
BY
ATTORNEY

Sept. 3, 1946.

A. G. RICHARDSON ET AL 2,406,853

ROTARY POSITION CORRECTOR

Filed Feb. 6, 1943

INVENTORS
AVERY G. RICHARDSON
FRANK O. CHESUS

BY

ATTORNEY

Patented Sept. 3, 1946

2,406,853

UNITED STATES PATENT OFFICE 2,406,853

ROTARY POSITION CORRECTOR

Avery G. Richardson, Boonton, N. J., and Frank O. Chesus, Islip, N. Y., assignors to Federal Telephone and Radio Corporation, Newark, N. J., a corporation of Delaware Application February 6, 1943, Serial No. 474,984

12 Claims. (Cl. 172—293)

1

This invention relates to rotary position finders, and in particular to an arrangement whereby the mechanical angular position of two synchronous motors may be determined and impelled to hold a predetermined relation with respect to the phase of the alternating voltage supplied thereto. The motors must be of the reluctance or salient pole type.

Our invention will be described as it may be applied to visual radio direction finding systems in which it is necessary to maintain a goniometer rotor coil and the rotating deflection coils of a remote indicator in a fixed relative position in order that a true indication of the bearing will at all times be obtained.

In order to obtain a fixed pattern or trace on the fluorescent screen of the indicator, it is necessary that the deflection coils be rotated at the same angular velocity that is given the rotor coil of the goniometer. Furthermore, in order that the pattern will indicate the true bearing of the incoming signal wave with respect to a fixed scale on the indicator, it is necessary that a predetermined and fixed phase relation exist between the rotor coil of the goniometer and the deflection coils of the indicator.

It is, therefore, an object of our invention to maintain a goniometer rotor coil and the rotating deflection coils of an indicator at a fixed angular position relative to each other, while at the same time maintaining synchronism or constant angular velocity therebetween.

Another object of our invention is to impel a fixed angular relationship between two rotating members.

A further object of our invention is to impel a slippage of poles of a synchronous motor until they occupy a predetermined position relative to the poles of a second synchronous motor, both motors being energized from the same power source.

A still further object of our invention is to produce a pattern on the fluorescent screen of an indicator which will give the true bearing of a signal received by a directive antenna and goniometer arrangement located remotely to the indicator.

Other features and objects of our invention will become apparent as we proceed with the specification and a description of the drawings in which.

In systems of the character disclosed in our invention, a directive antenna and a sensing antenna may be installed at a remote point. The directive antenna may be of the well known Adcock type, or of the equally well known crossed loop type. The voltages from the directive antenna may be fed to the stator coils of a goniometer unit through suitable transmission lines, so as to maintain a quadrature phase relation in the stator coils. The stator coils are mounted at right angles to each other, thereby producing a rotating magnetic field, which varies in strength in accordance with the direction of the received signal. A voltage is induced in the rotor coil of the goniometer in accordance with the strength of this received signal. This voltage is utilized to operate a receiver, which may be located at a remote point. The receiver amplifies and detects the signal and energizes the rotating deflecting coils of an oscillograph or indicator, preferably of the cathode ray type.

The electron beam of the indicator is deflected in accordance with the strength of the current flowing in the deflection coils. The pattern on the indicator screen indicates the direction line of the received signal, but not the true bearing or sense of the signal. The signal bearing is obtained by adding to the voltage obtained from the directive antenna, a second voltage obtained from a sense antenna, the latter being symmetrically arranged with respect to the directional antenna. The voltage from the sense antenna must also be applied to the receiver in suitable phase relation in order to form a trace on the oscillograph which indicates the true bearing of the received signal. The manner of applying the directional voltages and the sense voltage to the goniometer and associated equipment is completely described in a copending application of H. G. Busignies, Serial No. 468,668, filed December 11, 1942, and assigned to the same assignee.

Figure 1:
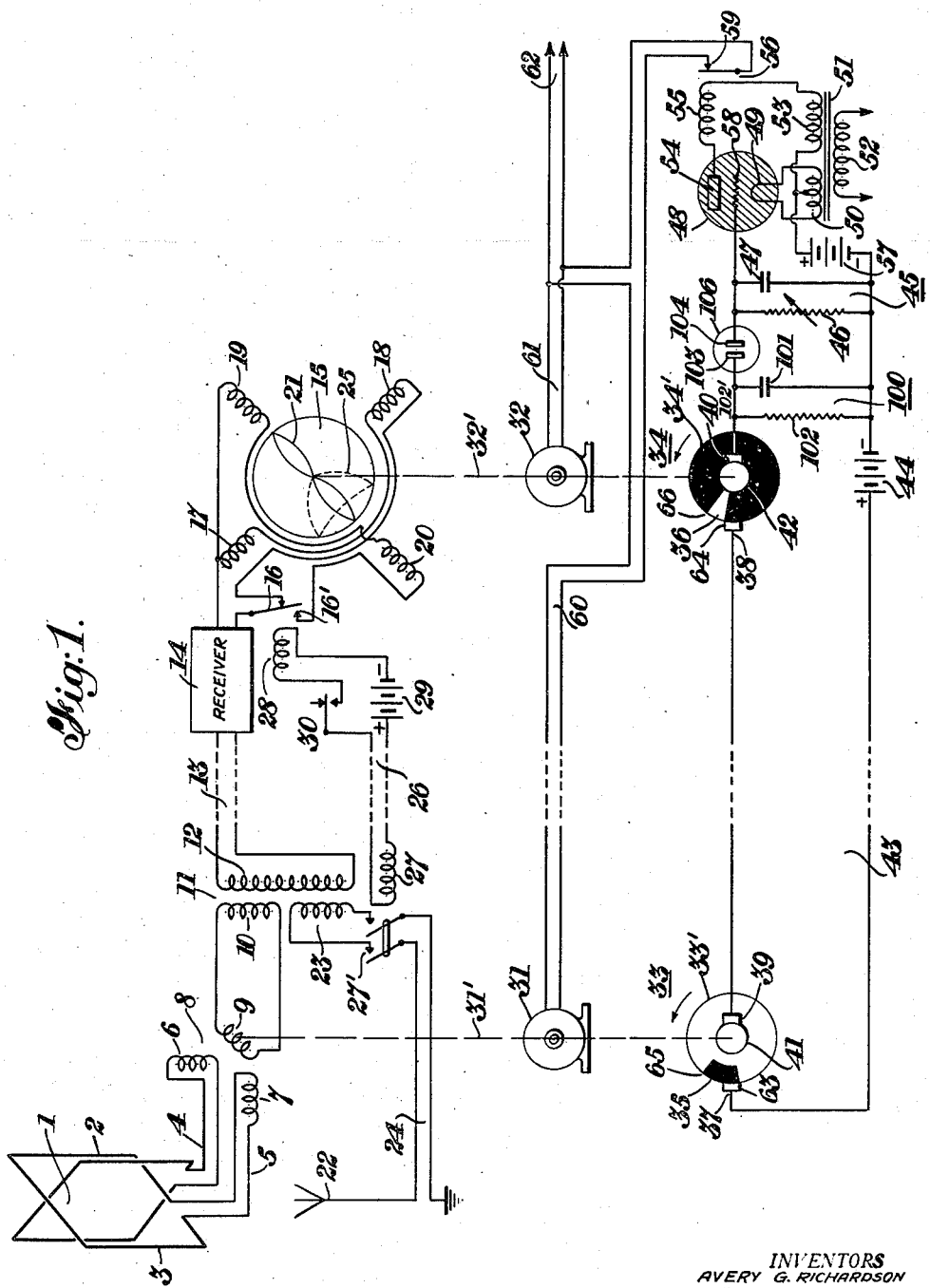
Figure 1 is a schematic diagram, showing a preferred embodiment of our invention in which the control apparatus for determining the angular relation between the rotors of two motors comprises rotating contactors driven by the motors.

Referring now to Figure 1 of the drawings, the reference numeral 1 indicates the directive antenna system. It is illustrated as composed of two loops 2 and 3 located at right angles to each other. Other forms of directive antennas such as the Adcock type could be employed. From these loops, transmission lines 4 and 5 lead to the stator coils 6 and 7, respectively, of a goniometer unit 8. The rotating coil 9 of the goniometer is connected to the primary 10 of a transformer 11. The output from the secondary 12 of this transformer is fed through a transmission line 13 to the input of a receiver 14. The receiver amplifies and detects the signal and energizes one of two pairs of rotating deflection coils of the indicator 15, depending upon the position of the armature 16 of the relay 16'.

In the position shown in the drawings, that is, with armature in its back position, the energy is fed to deflection coils 17 and 18. With the armature in its front position, deflection coils 19 and 20 are energized. The circuits of the receiver 14 are so organized that an increased input voltage thereto results in a reduction of current in the output circuit. Therefore, when no energy is being received, the direct current flowing through the deflection coils 17 and 18 produces a circular trace on the indicator screen. The centering of this trace, its diameter, the brightness of the trace, etc., are adjusted locally by known means. When an incoming signal is being received, a reduction of the output current of the receiver takes place, and the deflection coils, being de-energized either totally or in part, cause certain portions of the circle trace to recede toward the center of the indicator with the result that a modified trace is produced having an outline somewhat as shown at 21 in the figure. The position of the coils 17 and 18 is so adjusted, with respect to a suitable scale (not shown) associated with the indicator, that the elongated trace points in the direction of the received signal.

In order to determine the sense of the bearing, the sense antenna 22 is connected to a second primary 23 of the transformer 11 through the transmission line 24. The phase relations between the signals from the directive antenna and from the sense antenna are such that the trace on the fluorescent screen of the indicator points in a direction of 90° to the true direction of the signal. To overcome this condition, and have the indicator trace point in the true direction of the signal, the output from the receiver is connected to the second set of deflection coils 19 and 20, disposed at right angles to the coils 17 and 18. When adjustments are made to obtain proper signal strengths, etc., the pattern takes the approximate form shown in the dotted trace 25.

The sense antenna is connected to the receiver through the transformer 11 by closing the contacts 27'. This closure is effected by completing the series circuit 26, consisting of relay coil 27, relay coil 28, an energy source shown as a battery 29, and the operating key 30.

In order to maintain a constant angular velocity of the rotor coil 9 and the deflector coils 17, 18, 19 and 20, and at the same time also maintain a fixed angular relation therebetween, we employ two synchronous motors 31 and 32 for driving the rotor coil and the deflector coils, respectively. The dotted lines 31' and 32' indicate the mechanical connections between the motors and the coils. These synchronous motors are of the salient pole type, and in this particular adaptation of our invention, we prefer to use motors having four poles each, thereby giving a rotation of thirty cycles per second when connected to a standard sixty cycle source. This is not to be construed as a limitation to our invention, since motors having a greater or lesser number of poles may be employed.

Also connected to the synchronous motors 31 and 32 are two rotary contactors or controllers 33 and 34, respectively. These controllers are preferably directly connected to the shafts of the synchronous motors, but if desirable, they could be otherwise connected, such as for example, through suitable gearing. Contactor 33 comprises a conducting disc 33' having one insulating segment 35 in its periphery, while contactor 34 consists of an insulating disc 34' having a conducting segment 36. The width of the segments 35 and 36 is preferably made about 10° or about one thirty-sixth of the total circumference of the discs. Brushes 37 and 38, which bear on the peripheries of the discs 33' and 34', must be of such a width and so placed relative to the contactor discs that when the apparatus is functioning properly, the duration of the break contact of contactor 33 must be substantially equal to the duration of the make contact of contactor 34, and furthermore, the instant of break on one contactor should coincide with the instant of make on the other contactor and vice versa. The reason for this will be brought out presently.

Another pair of brushes 39 and 40 make contact with slip rings 41 and 42 of the rotary contactors 33 and 34, respectively, these slip rings being connected with the conducting segments of both contactor discs.

A series circuit 43 comprising the contactor 33, the contactor 34, a potential source shown as a battery 44, and a time delay circuit or network 100 consisting of a capacitor 101 and a resistor 102 connected in parallel is employed to energize an energy translator, shown as a grid controlled gaseous discharge tube 48, at those times when the rotors of the motors do not have the desired angular phase relation. The discharge tube may be of the type frequently identified in the art as a "Thyratron." The filament 49 of the "Thyratron" is energized from the secondary winding 50 of the transformer 51, the primary 52 of this transformer being connected to a suitable power source. The secondary winding 53 suppies potential to the anode 54 of the "Thyratron" through the winding 55 of the relay 56. A potential source 57 connected in series with the resistor 46 in the delay circuit 45 is employed for biasing the grid 58 of the "Thyratron" to cut-off, thereby preventing a flow of current in the plate circuit of the "Thyratron" during normal operating conditions, and thus permitting the contact 59 to remain in the closed position as shown. In this position, both synchronous motors 31 and 32 are supplied with sixty cycle current through the leads 60 and 61 from a suitable source 62.

Between the time delay circuit or network 100 and the delay circuit 45 is an ionization or gaseous discharge tube 106 of the diode type, having two electrodes 103 and 104. The function of this ionization tube will be described shortly.

With the contactor brushes in the position shown on the drawings and rotation in the direction of the arrows, it is assumed that the brush 37 is just breaking at the point 63, while the brush 38 is just making at the point 64. Approximately a thirty-sixth of a rotation later, the brush 37 will make at the point 65, while the brush 86 will be breaking at the point 66. Under these conditions, it will be seen that at no time is the circuit 43 energized from the battery 44. With the commutating devices operating as just described, it is assumed that the relative positions of the rotor coil 9 and the deflector coils of the indicator are in their proper relative position to produce the desired indication or trace on the screen of the indicator.

However, if this latter condition is not true, it means that the contactor brushes with respect to their cooperating make and break positions are such that the series circuit 43 is completed, and that a positive pulse appears at the point 102'' of the network 100. During successive revolutions of the contactors 33 and 34, the potential of the electrode 103 increases until a value is reached sufficient to break down the gaseous path between the electrodes 103 and 104 of the discharge tube 106. When this occurs, current momentarily flows in the series circuit formed by the gas discharge tube 106, the delay circut 45 and the network 100, thereby transferring this positive potential to the grid 58 of the "Thyratron" 48. The magnitude of this positive pulse is sufficient to overcome the negative biasing potential of the battery 57 thus causing the plate filament circuit of the "Thyratron" to break down and allow current to pass through the relay coil 55. The energizing of this coil opens the contact 59 and causes one of the motors 31 to be de-energized. The contact 59 remains open long enough for the armature of the motor 31 to slow down one-quarter of a revolution, or the angular distance between two of its salient poles. In so doing, the relative position of the brush 63 is changed one-quarter of a revolution with respect to the insulating segment 35. This also causes the rotor 9 to fall back one-quarter revolution.

The time interval during which the contract 59 remains open is controlled by the constants of the network 100 and the delay circuit 45 in the following manner:

Immediately after as the discharge tube 106 breaks down and transfers voltage from the electrode 103 to the electrode 104 (or the grid 58), the insulating property of the space between these electrodes is again restored, and this results in the isolation of the network 100 and the circuit 45. During this period of isolation the positive charge on the grid 58 leaks off through the resistor 46, until the grid potential is no longer sufficient to fire tube 48 and keep the plate current flowing. The resistor 46 may be made variable, thus permitting control of the time during which the plate current flows. During this same time, the circuit 43 is again building up a charge on the electrode 103 of the tube 106 and the sequence of operation continues in the event that the rotor of motor 31 has not attained its desired position. If the rotor has attained the desired position, the contactor segments and brushes of the contactors 33 and 34 are in such position that no voltage can be established on the electrode 103, the two motor rotors are in proper angular relationship, and the contact 59 remains closed.

Figure 2:
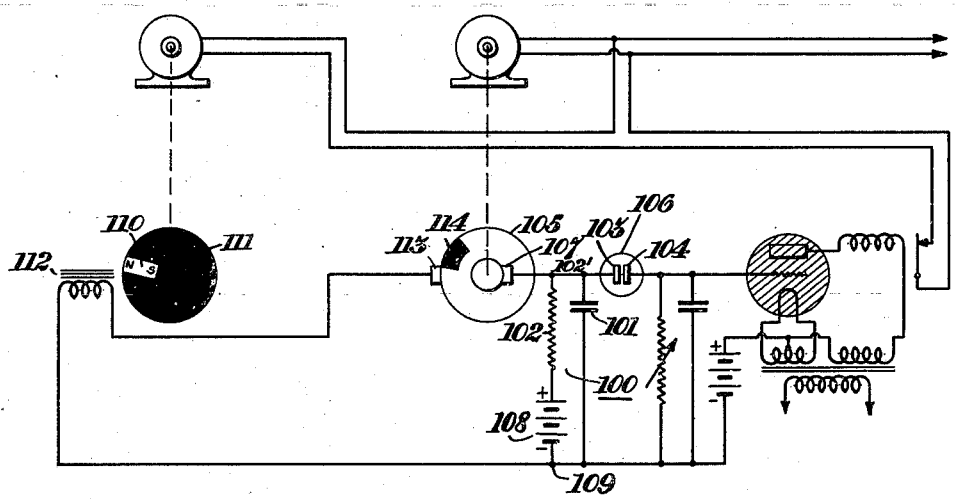
Figure 2 is a modification of the control apparatus of Figure 1.

Referring now to Figure 2, we have illustrated therein a modification of the contactor or controller arrangement shown in Figure 1. In this circuit, instead of employing a battery and two contactors in series to produce a positive pulse on the electrode 103 of the discharge tube 106, we have shown a means whereby an impulse is produced by a magnet 110 which is inserted in a disc 111, and rotated by motor 31. As the magnet passes in inductive relationship with coil 112, a pulse is generated. This pulse may or may not be transmitted to the electrode 103, depending upon the position of the insulating segment 114, which is inserted in the periphery of the conducting, rotating disc 105, the latter being driven by the motor 32. If the two motors are in their desired angular relationship as above described, at the moment the pulse in 112 is generated, the segment 114 is passing the brush 113, and the pulse is blocked from being transmitted to the electrode 103. On the other hand, if the rotors of the motors are not in the desired angular relationship, the brush 113 will be making contact on the conducting disc 105, and the pulse will be transmitted through this disc to the brush 107 and on to the electrode 103. Since the pulse generated in the coil 112 consists of a positive value followed by an equal negative value, it is necessary to either rectify this pulse before it is applied to the electrode 103, or to provide some other means whereby the electrode is raised to a value sufficient to break down the gaseous discharge tube 106. In Figure 2, we have illustrated a battery 108, as a means for increasing the potential of the electrode 103. For example, if at first a negative pulse is transmitted to the electrode, this pulse merely reduces the effective potential between the point 109 and the electrode 103 due to the battery 108. On the other hand, when the positive pulse reaches the electrode 103, it adds to the potential of the battery 108 and these values are so chosen that the voltage across the tube 106 is sufficient to break down the gap between its electrodes. From this point on, the operation of the circuits of Figure 2 is identical with those shown in Figure 1.

Figure 2A:
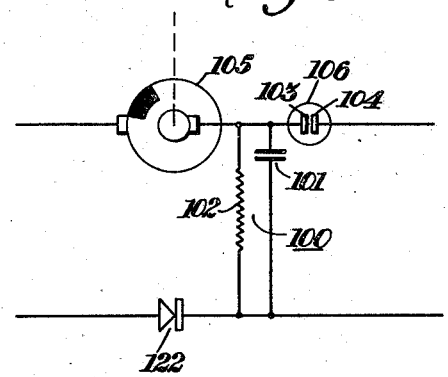
Figure 2A is a modification of a portion of the control circuit of Fig. 2.

In Figure 2A we have shown a modification of that portion of Fig. 2 employed to build up a positive potential on the electrode 103 of the ionization tube 106. In this figure the biasing battery 108 is omitted and the positive potential for charging the condenser 101 is obtained through the rectification by the rectifier 122 of the pulses generated in the coil 112.

Figure 3:
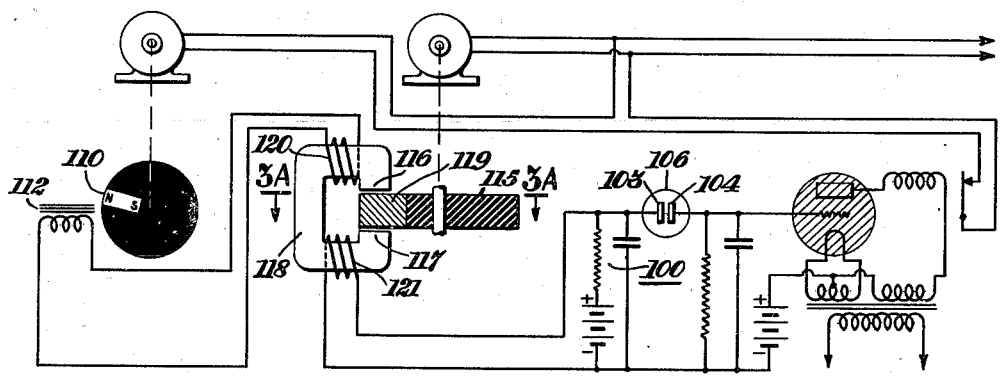
Figure 3 is a modification of the control apparatus of Figure 2.
Figure 3A:
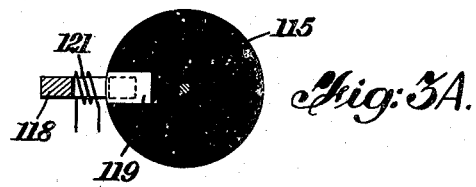
Figure 3A is a sectional view of one portion of the apparatus of Fig. 3.

In Figure 3, a modification of the circuit shown in Figure 2 is illustrated. In this circuit, we have retained the impulse producing means shown as the magnet 110 and the coil 112 of Figure 1, but in place of the conducting disc 105 and its insulating segment 114, as shown in Figure 2, we have illustrated a permeable device for passing the generated impulse to a circuit 113. This device consists of a steel disc 115 rotated by the motor 32 between the poles 116 and 117 of the transformer 118. The disc 115 has a non-magnetic segment 119 inserted in its periphery as shown in Fig. 3A, the latter being a view taken through the section 3A—3A of Fig. 2. As the insulating segment passes between the poles 116 and 117, it will be seen that the reluctance of the magnetic flux path is increased over that which exists when a portion of the steel disc is between the poles. The insulating segment therefore acts to substantially block any current impulse originating in the coil 112 and flowing in the coil 120 from inducing an impulse in the coil 121. Any impulse which is induced in coil 121 when a steel portion of the disc 115 is between the poles 116 and 117 is passed on to the circuit 100 from whence it operates on the gas filled diode in exactly the same manner as does the impulse blocking arrangement of Fig. 2. Whether the permeable device of Fig. 3 or the rotating contactor of Figs. 1 and 2 acts as an impulse blocking or an impulse passing device depends on the point of view, but we prefer to consider them primarily as an impulse blocking device.

Figure 4:
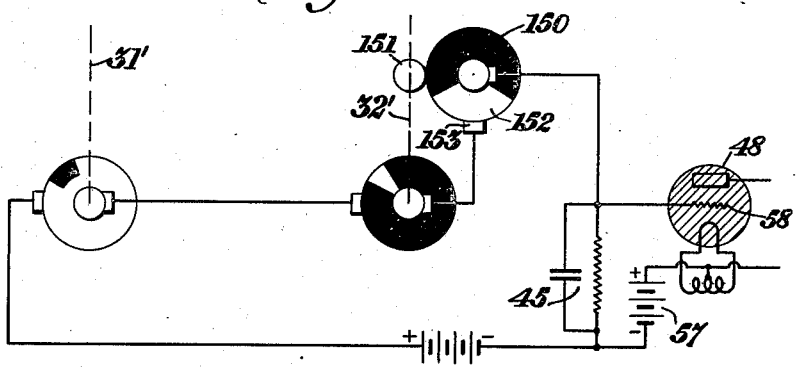
Figure 4 represents a still further modification of the apparatus shown in Figures 1, 2 or 3, wherein a mechanical device has been substituted for a portion of the electrical means shown in those figures.

Fig. 4 shows a modification of the control apparatus of Figures 1, 2 or 3 wherein a mechanical device has been substituted for the network 100 and ionization tube 106, shown in those figures. The network 100 as above stated acts to store positive pulses for a predetermined time, and until a sufficient potential has been developed thereacross to break down the gaseous space between the electrodes 103 and 104 of the diode 106. In Fig. 4, the rotary contactor 150 is geared to the shaft 32' through the pinion gear 151. The arc of the conducting segment 152 is made of such a length that continuous contact between it and the brush 153 is maintained through several revolutions of the contactor 34. In this way, several impulses are passed to the circuit 45 until the potential across this circuit is sufficient to overcome the potential of the grid biasing battery 57, which results in the operation of the gaseous triode or "Thyratron" 48. After the plate current of the triode begins to flow and the relay 56 operates, thereby causing the motor 31 to slow down, the insulating portion of the contactor disc 150 passes the brush 153 and isolates the circuit 45 from the rotary contactors. The potential on the grid 58 leaks off during this isolation period until it is no longer capable of initiating a discharge through the plate-cathode circuit of the triode and the relay 56 again closes. This, in turn, permits power to be supplied to the motor 31.

It should not be overlooked that the sequence of operation described in the above paragraph relating to Fig. 4 can only take place when current can pass through the contacts of the rotating contactors 33 and 34, as described in connection with Fig. 1. Similar remarks apply if the above-mentioned mechanical device were substituted for the delay circuit 100 and the ionization tube 106 in Figures 2 and 3.

While we have shown and described several embodiments of our invention, it will be understood that they are given by way of example only, and not as limiting the scope of the invention as set forth in the objects and the appended claims.

We claim:

1. Means for impelling a given angular relationship between two rotating members, comprising a first synchronous motor for rotating one of said members, a second synchronous motor for rotating the other of said members, both motors being of the salient pole type, a power supply for both motors, a first contactor operated by one of said motors, a second contactor operated by the other of said motors, both of said contactors having open and closed durations, the open duration of one contactor being equal to the closed duration of the other contactor, when both motors are revolving at synchronous speed, a series circuit comprising an energy source, said first and second contactors and an energy translator, a means for causing one of said motors to slip one of said salient poles whenever said translator is energized from said series circuit, and means for repeating the action of said first means until said given angular relationship is attained.

2. In combination, a first rotating member, a synchronous motor driving said first rotating member, a second rotating member, a second synchronous motor driving said second rotating member, a power source for each of said motors, and means for determining a given angular relationship between said first and said second rotating members comprising, a first contactor operated by said first motor, a second contactor operated by said second motor, said first and second contactors having open and closed periods, the closed period of said first contactor being equal to the open period of said second contactor, and the open period of said first contactor being equal to the closed period of said second contactor, an energy translator, a series circuit comprising an energy source, said first and second contactors and said translator, and means operated by said translator for disconnecting the power source from one of said motors when said series circuit is completed through said contactors, whereby said one of said motors is caused to slow down until said given angular relationship is determined.

3. Means for impelling a given angular relationship between two rotating members in accordance with claim 1, wherein said energy translator comprises a grid controlled gaseous discharge tube and a time delay circuit for controlling the operation of said tube.

4. Means for impelling a given angular relationship between two rotating members in accordance with claim 1, wherein said energy translator comprises a grid controlled gaseous discharge tube having a time delay circuit connected to its input circuit.

5. Means for impelling a given angular relationship between two rotating members, comprising a first synchronous motor for rotating one of said members, a second synchronous motor for rotating the other of said members, a power supply for normally energizing both motors, an impulse generating device operated by said first motor and having a predetermined active period, a translating device controlling the de-energization of one of said motors, and means for energizing said translating device by said impulse generating device, said means including an impulse blocking device operated by said second motor, said impulse blocking device having an effective blocking period substantially equal to the active period of said impulse generating device, whereby whenever said periods do not coincide in time, said translating device is effective to control the de-energization of one of said motors until said given angular relationship is obtained.

6. Means for impelling a fixed, predetermined angular relationship between the rotors of two synchronous motors, comprising a power supply for normally energizing both of said motors, a voltage generating device operated by one of said motors a circuit adapted to be energized by said voltage, said circuit including said generating device, a translator, and a current blocking device operated by the other of said motors, means controlled by said translator for de-energizing one of said motors, said blocking device preventing the passage of current to said translator when said angular relationship exists and intermittently permitting the passage of current to said translator when said angular relationship does not exist, whereby said translator causes said one of said motors to be momentarily reduced in speed until said angular relationship is obtained.

7. Means for impelling a predetermined angular relationship between the rotors of two synchronous motors, comprising a power supply for normally energizing both of said motors, an impulse generating device operated by one of said motors, an impulse blocking device operated by the other of said motors, both of said devices having active periods of substantially equal duration, a circuit comprising said generating device, said blocking device and a translator, said generating device controlling said translator means controlled by said translator for de-energizing one of said motors, when the active periods of said generating and said blocking devices do not coincide in time.

8. Means for impelling a predetermined angular relationship between the rotors of two synchronous motors in accordance with claim 7, wherein said translating device comprises a grid controlled gas discharge tube having an input circuit, said input circuit comprising a first time delay circuit, an ionization tube, and a second time delay circuit, said first delay circuit controlling said discharge tube and said second delay circuit controlling said ionization tube.

9. Means for impelling a predetermined angular relationship between the rotors of two synchronous motors in accordance with claim 7, wherein said blocking device having an active period comprises a two-winding transformer having a gap in the permeable core thereof, and means for increasing the reluctance of said core during said active period.

10. Means for impelling a predetermined angular relationship between the rotors of two synchronous motors in accordance with claim 7, wherein additional means are provided for electrically isolating said translator from said blocking device for a predetermined number of pulses of said pulse generating device.

11. Means for impelling a predetermined angular relationship between the rotors of two synchronous motors, comprising a power supply for normally energizing both of said motors, a translating device controlling the de-energization of one of said motors, a control circuit therefor, a controller in said control circuit, permitting opening and closing the same, said controller being operated by one of said motors, and means for applying a voltage to said translator through said controller, said means being in said control circuit and operated by the other of said motors.

12. Means for impelling a predetermined angular relationship between the rotors of two synchronous motors in accordance with claim 10, wherein said translator comprises a grid controlled gas discharge tube and a relay.

AVERY G. RICHARDSON.
FRANK O. CHESUS.